United States Patent [19]

Dombrowski et al.

[11] Patent Number: 5,297,782
[45] Date of Patent: Mar. 29, 1994

[54] MODULAR SNUBBER APPARATUS

[75] Inventors: Kenneth J. Dombrowski, Wheaton; Roger W. Lhotak, Elburn, both of Ill.

[73] Assignee: The Chamberlain Group, Inc., Elmhurst, Ill.

[21] Appl. No.: 774,210

[22] Filed: Oct. 10, 1991

[51] Int. Cl.⁵ .......................... F16F 1/12; G05F 5/06
[52] U.S. Cl. ........................... 267/177; 49/199; 403/326; 267/71
[58] Field of Search .................. 267/177, 196, 70, 71; 198/208; 403/326; 211/119.02, 119.05, 119.09; 163/193, 188; 44/199, 280, 360

[56] References Cited

U.S. PATENT DOCUMENTS

| 916,081 | 3/1909 | Williams, Jr. et al. | 104/117 |
|---|---|---|---|
| 1,287,463 | 12/1918 | Schwitzer | 403/326 |
| 1,290,964 | 1/1919 | Fuller | 104/117 |
| 2,128,030 | 8/1938 | Koleno | 267/72 |
| 2,567,727 | 9/1951 | Quackenbush | 403/326 |
| 2,687,297 | 8/1954 | Miller | 160/193 |
| 3,109,213 | 11/1963 | O'Sullivan | 211/119.09 |
| 3,235,246 | 2/1966 | Cowan | 49/139 |
| 3,256,594 | 6/1966 | Howard et al. | 267/177 |
| 3,306,121 | 2/1967 | Jenkins | 74/242.15 |
| 3,343,858 | 9/1967 | Rice | 287/119 |
| 3,833,045 | 9/1974 | Sivin | 160/193 |
| 4,739,584 | 4/1988 | Zellman | 49/199 |

FOREIGN PATENT DOCUMENTS

0265727A1 5/1988 European Pat. Off.
0317164A1 5/1989 European Pat. Off.
0343136A1 11/1989 European Pat. Off.

*Primary Examiner*—Matthew C. Graham
*Attorney, Agent, or Firm*—Fitch, Even, Tabin & Flannery

[57] ABSTRACT

A snubber for tension members such as drive chains and drive belts includes a spindle having an upstanding wall at one end and a recess at the opposite end. A compressed spring is carried on the spindle and is retained thereon in its compressed state by a split ring received in the recess. The snubber can be used with tension members associated with garage door openers, for example.

6 Claims, 4 Drawing Sheets

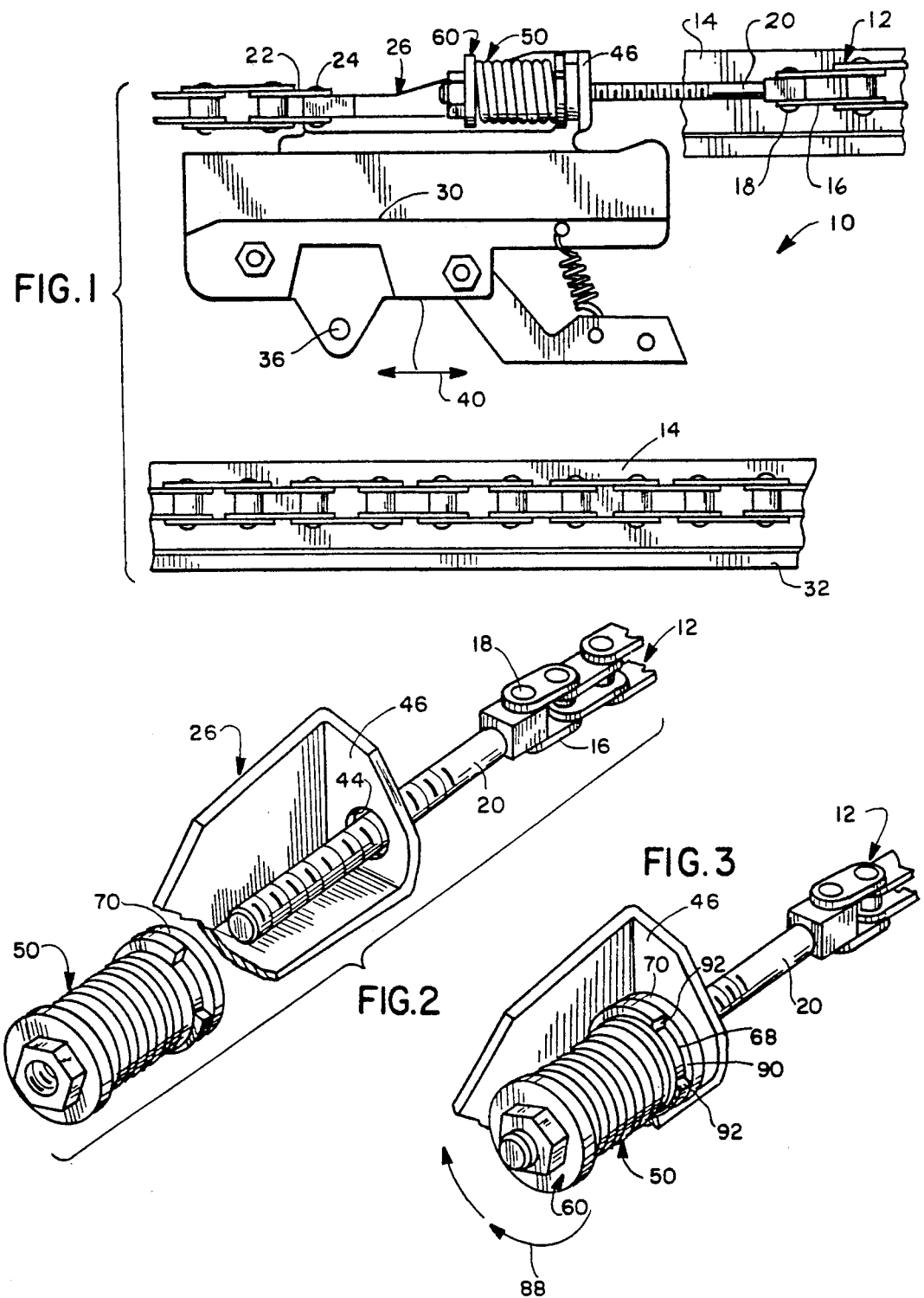

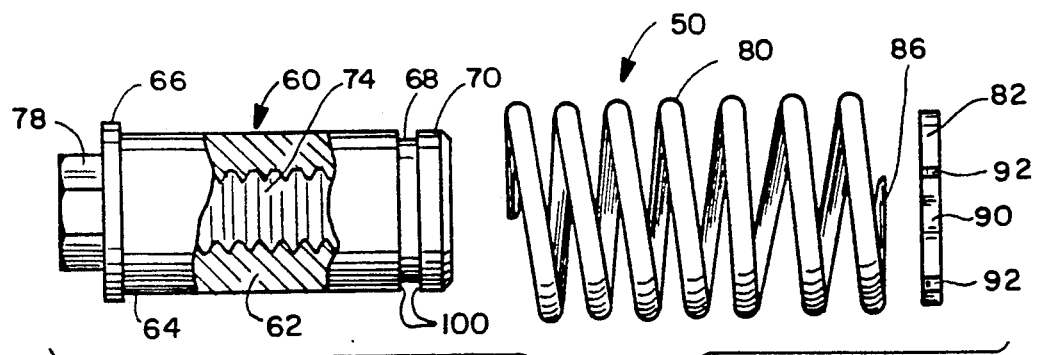
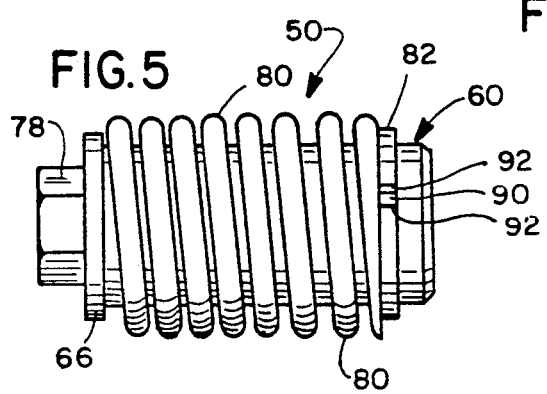
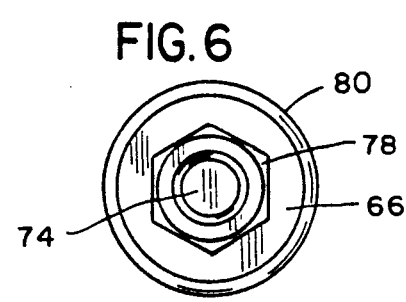
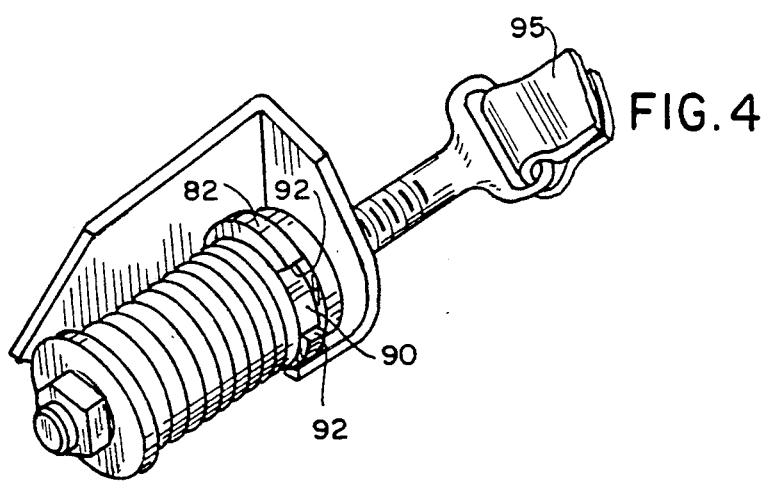
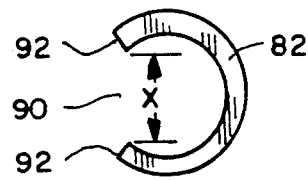

MODULAR SNUBBER APPARATUS

BACKGROUND OF THE INVENTION

1. Field of the Invention

The present invention pertains to mountings for members loaded in tension, and in particular to the mounting of flexible drive members such as belts or chains.

2. Description of the Related Art

Many devices in use today include a tension member, either rigid or flexible, which is subjected to intermittent loads. One example of a rigid tension member is given in U.S. Pat. No. 3,306,121 which describes a screw shaft which has an end secured to an alternator mounting on an internal combustion engine, and driven by a fan belt. A coil spring disposed about the screw shaft maintains a spring tension on the fan belt. The spring is backed by a stationary mounting bracket mounted to the engine. The screw shaft is free to move through the mounting bracket to allow the spring to work against forces applied to the fan belt.

However, many systems employ flexible tensile members such as ropes and cables. U.S. Pat. No. 916,081 discloses an arrangement for applying a static tension to a flexible tension member. The tension member is passed through a mounting bracket and is connected to a hollow shaft with external threads, which also passes through the mounting bracket. On the upstream side of the bracket, a spring is held captive between the bracket and a free end of the hollow tube. A threaded nut advances the hollow tube so as to vary the spring tension applied to the tension member.

U.S. Pat. No. 1,290,964 discloses a resilient cable support in which a cable is attached to a hook, with the body of the hook being passed through a rigid support. The body of the hook is threaded to receive a threaded fastener. A spring is held captive between the threaded fastener and the mounting. By advancing the threaded fastener along the hook body, the spring tension is adjusted, which in turn adjusts the tension in the cable.

U.S. Pat. No. 2,128,030 discloses a tightener for supplying a tension to a cable. A hollow enclosure has opposed open and closed ends. A threaded attachment member extends from the closed end for securement to a stationary support. A shaft is inserted through the open end of the housing to have a first portion disposed within the housing and a second portion disposed outside of the housing. A coil spring is slid over a first portion of the shaft and is held captive thereon by an enlarged end of the shaft. The second portion of the shaft, extending outside of the housing, is connected to a cable. The coil spring acts to withdraw the second portion of the shaft into the hollow body. Initially, the second portion of the shaft is pulled outside of the hollow body to store energy in the coil spring, and a pin is inserted in the second portion of the shaft to prevent retraction into the hollow body. After the device is installed between a rigid support and a cable, the pin is removed to allow a slight expansion of the spring and a resulting tensioning of the cable. In order to assemble the device, the hollow body must be made of several components, herein three components, a part resembling a pipe nipple, and a pair of threaded end caps to be fitted to the pipe nipple, one having a central opening through which the second portion of the shaft is inserted, prior to assembly. The device is generally unsuitable for use with tension members having a threaded shaft at the end to be secured, and the device is costly to fabricate.

U.S. Pat. No. 3,109,213 discloses an automatic tension release device for cords which contract when wet. A cord is passed through a cylindrical barrel having an arrangement resembling a ball bearing race at one end. The bearing balls engage the cord, preventing movement relative to the cylinder. The cylinder is inserted in a conical housing which presses the bearing balls against the cord. The conical tube is secured with a bail to a stationary support. A second cord extends between the cylinder and the stationary support. The second cord is of a design to shrink faster than the cord whose tension is being controlled. When the second cord is wetted, it contracts to move the cylinder relative to the conical tube, thus allowing the bearing balls to move away from the cord being controlled, thus releasing tension on the cord.

U.S. Pat. No. 3,343,858 describes a resilient link in which a generally cylindrical housing has a closed end for attachment to a tension member, and an opposing open end having a central bore and a radially directed slot extending from the central bore. The housing has a side portion removed, forming an opening which extends to the slot and the central bore, thus forming a continuous passageway. A shaft having a first, enlarged end and a second free end is inserted through the passageway of the housing with the shaft aligned with the central bore of the housing. A coil spring and a disk-like wall are slid over the second end of the shaft with the disk-like wall compressing the spring against the enlarged, first end of the shaft. A removable pin holds the disk-like wall in position, storing energy in the coil spring. The shaft assembly is then inserted in the passageway of the housing, with the spring, disk-like wall and enlarged end of the shaft received in the body of the housing, and the second, free end of the shaft extending through the bore at the open end of the housing. The removable pin is accessible through the open side of the housing, so as to be removable once the resilient link is installed in a system. No other adjustment is provided in the resilient link, except for the provision of allowing the spring to expand once the pin is removed. The device is of a complicated construction and expensive to fabricate.

A need has existed for an improved snubber device for tensile members, particularly flexible tensile members. For example, improved mounting devices have been sought for garage door openers having a drive chain or drive belt coupled to a trolley providing attachment to a garage door. Heretofore, certain garage door opener types have had drive members provided with free ends, which are mounted to spaced portions of the trolley. One free end of the drive member is provided with a threaded shaft, which is inserted through a mounting wall on the trolley. By manipulating nut fasteners mated to the threaded shaft, the threaded shaft can be moved relative to the trolley mounting wall, thereby adjusting the tension on the drive member. Snubber devices have been sought for use with the above-mentioned types of garage door openers and similar mounting systems for tension members. However, in many applications, such snubber devices must be both economical to fabricate and quickly installed without difficulty, so as to be commercially attractive in competitive markets.

SUMMARY OF THE INVENTION

It is an object according to the present invention to provide a snubber device for tension members.

Another object according to the present invention is to provide a snubber device for drive chains and drive belts of the type used in garage door openers.

A further object according to the present invention is to provide a snubber device for existing garage door opener drive members.

Yet another object according to the present invention is to provide snubber devices of the above-described types in which spring energy is stored in the snubber device, and is quickly and easily released once the device is mounted in place.

A further object according to the present invention is to provide snubber devices of the above-described types requiring a minimum of tools and special expertise to install, yet which is formed from a minimum number of inexpensive parts.

These and other objects according to the present invention, which will become apparent from studying the appended description and drawings, are provided in a modular snubber apparatus for securing one end of a flexible drive member to a wall mounted on a trolley which is moved by the flexible drive member, the one end of the flexible drive member having a threaded shaft extending toward the wall, and the wall having an aperture for receiving the threaded shaft, said apparatus comprising:

a double-ended spindle having an upstanding wall at a first end and an internal threaded bore for engagement with the threaded shaft extending between the first end and an opposed second end of the spindle;

double-ended spring means carried on said spindle having a first end in contact with said spindle wall and a second free end; and retention means removably mounted on the second end of the spindle engaging the second end of the spring so as to retain the spring means on said spindle.

BRIEF DESCRIPTION OF THE DRAWINGS

In the drawings, wherein like elements are referenced alike:

FIG. 1 is a fragmentary elevational view of a trolley drive system for a garage door operator, illustrating features of a snubber apparatus according to principles of the present invention;

FIGS. 2, 3 and 4 are fragmentary perspective views thereof showing installation of the snubber apparatus;

FIG. 5 is an elevational view of the snubber apparatus illustrating aspects of the present invention;

FIG. 6 is an end view of the snubber apparatus of FIG. 5;

FIG. 7 is an exploded side elevational view of the apparatus illustrated in FIG. 5;

FIG. 8 is an elevational view of a retainer clip;

DETAILED DESCRIPTION 07 THE PREFERRED EMBODIMENT

Figure 9:
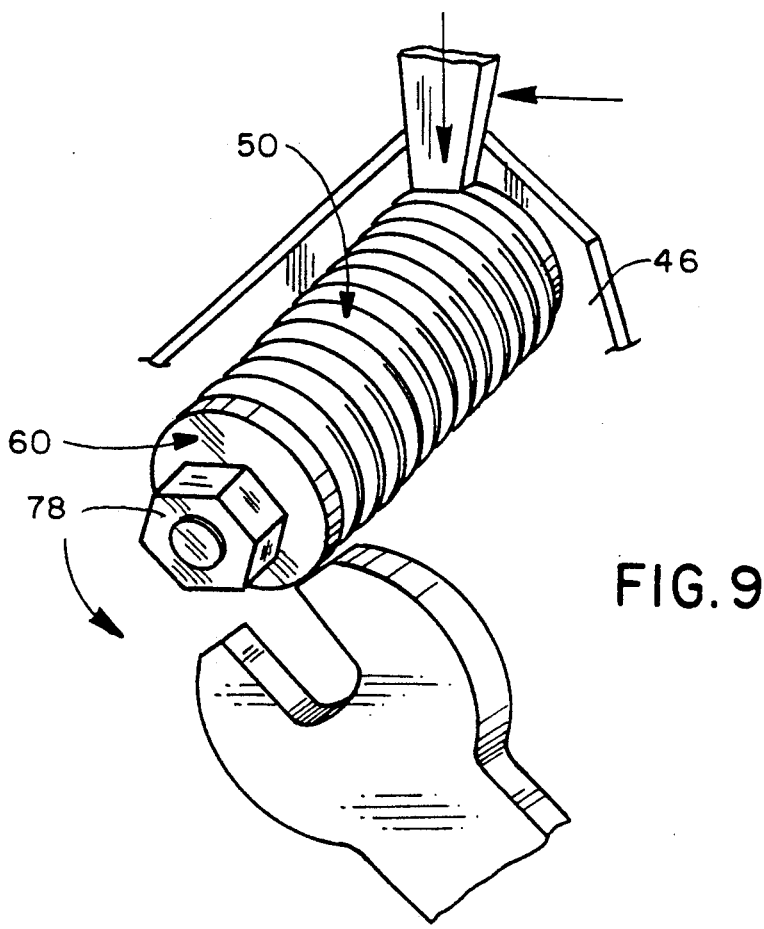
FIGS. 9 and 10 are perspective views showing installation of the snubber apparatus.

Referring now to the drawings, and initially to FIG. 1, a garage door opener assembly is generally indicated at 10. A double-ended drive chain 12 is wrapped around a support rail 14 which extends between the drive motor of the garage door opener system (not shown) and the wall to which the garage door is mounted. The chain 12 has a first end 16 which is pinned at 18 to a threaded shaft 20. Chain 12 also includes a second end 22, pinned at 24 to a trolley indicated at 26. The trolley 26 is of a conventional design, and includes walls 30 which ride on the flange 32 of support rail 14. The support rail 14 is of a generally inverted T-shaped cross section. Trolley 26 further includes a mounting eye 36 for connection to a garage door, to move the garage door back and forth in a direction of double-headed arrow 40.

The drive chain 12 is wrapped about a gear sprocket located adjacent the end 22 of the drive chain, to the left of FIG. 1. The gear sprocket is driven in opposite directions, so as to move trolley 26 in the directions of double-headed arrow 40. During opening of the garage door, the trolley of FIG. 1 moves to the left, and the direction of movement is reversed on a door closing operation. Thus, during a door closing operation, when the trolley is moved to the right-hand direction in FIG. 1, tension at the end 16 of the drive chain is relaxed, and end 16 may even be placed in a slight compression, during some operating conditions of the garage door and garage door opener system. The free end of threaded shaft 20 is inserted through an opening 44 in a mounting wall 46 of trolley 26 (see FIG. 2), and is mounted to wall 46 with a snubber apparatus according to the present invention, generally indicated at 50.

The snubber apparatus 50 replaces a nut fastener which was used previously to rigidly couple shaft 20 to wall 46 of the trolley. Thus, any localized reduction in tension in the drive chain adjacent end 16 could result in a slackening of the chain if the chain was not properly adjusted at the time of installation, or the chain drive system had changed during use.

Turning now to FIG. 7, the snubber apparatus 50 includes a spindle generally indicated at 60. The spindle 60 includes a hollow cylindrical body 62 with a first end 64 having an upstanding end wall or shoulder 66. An annular groove 68 is formed in the opposite end 70 of the spindle body. As can be seen in FIG. 7, the central portion of body 62 is partly broken away to reveal a threaded central bore 74. Spindle 60 also includes an hexagonal protrusion, generally resembling the outer surface of a nut fastener, indicated at 78.

Referring again to FIG. 7, snubber apparatus 50 further includes a coil spring 80 and a retaining means, preferably a split ring retainer 82. Spring 80 is telescoped over the free end 70 of the spindle body and is butted against shoulder 66. As can be seen in FIG. 7, spring 80, shown in its relaxed condition, has an axial length greater than the length of the spindle body. The spring 80 is compressed with means, not shown, such that the free end 86 is advanced past recess 68. The split retainer ring 82 is then installed in recess 68 in the manner illustrated in FIG. 5, to hold spring 80 captive on spindle 60. As will now be appreciated, spring energy is stored in snubber apparatus 50, but is securely restrained against inadvertent release of the spring energy. Thus, the snubber apparatus 50 resembles a preassembled capsule, which, from an installer's point of view, may be installed as a nut fastener in a manner which will now be explained.

Figure 11:
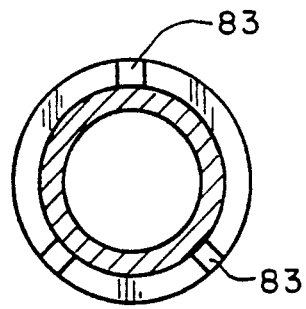
FIGS. 11 and 12 show a spindle apparatus thereof.
Figure 12:
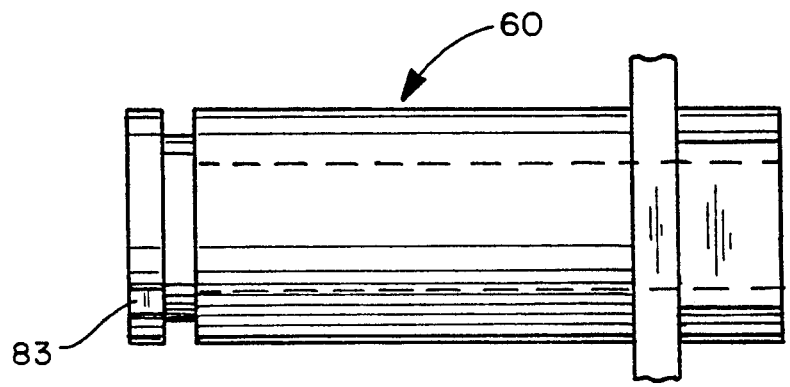
Figure 13:
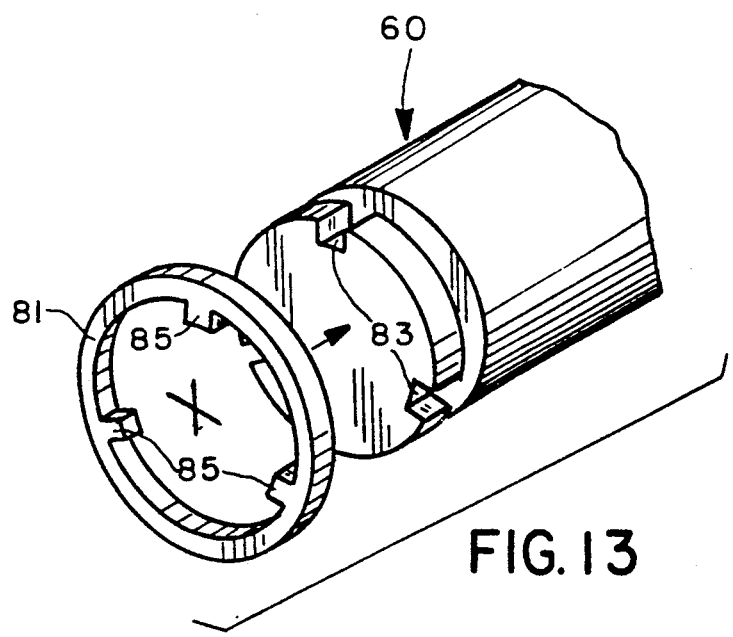
FIG. 13 shows an optional retention means to be fitted with the spindle of FIG. 12.

If desired, an optional retaining means, such as the twist-lock retaining ring 81 of FIGS. 11-13, can be used with a spindle 60 provided with optional notches 83 to receive the teeth 85 of ring 81.

Referring now to FIG. 2, the free end of threaded shaft 20 is inserted through aperture 44 of wall 46. Thereafter, snubber apparatus 50 is mated to threaded shaft 20 with free end 70 of the snubber body being located adjacent wall 46. The internal threaded bore 74 is then mated to threaded shaft 20 by rotating the snubber apparatus 50 in the direction indicated by arrow 88 in FIG. 3. Preferably, the snubber apparatus is manually rotated using finger pressure, without the use of tools. Snubber apparatus 50 is threadingly advanced along shaft 20 until the free end 70 contacts wall 46. A portion of the slack in chain 12 is taken up manually, with only finger tightening of apparatus 50.

Figure 10:
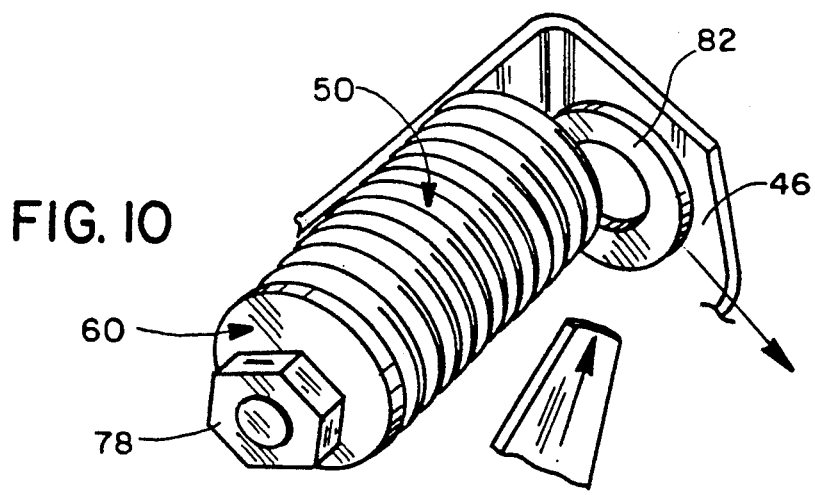

As can be seen in FIGS. 4 and 7, retainer 82 is slotted at 90, and thus comprises a split ring. A blunt instrument such as a screw driver can be employed in the manner indicated in FIGS. 9 and 10, to remove the retainer from spindle 60, thus releasing spring 80 for expansion. With the snubber apparatus according to the present invention, a portion of the slack in drive chain 12 is taken up before the spring is released. The split ring 82 has been found advantageous in this regard, since it includes flat surfaces 92 facing gap 90. The blunt instrument can therefore be inserted in gap 90 to bear against the flat surfaces, and with torque to nut-like protrusion 78 applied, the gap 90 is opened to a spacing equal to the outer circumference of spindle body 62, thus allowing transverse removal of retainer 82 from the spindle body, as illustrated in FIG. 10. Referring to FIG. 8, the retainer 82 of the preferred embodiment has a gap x ranging between approximately 80 to 90 percent of the diameter of recess 68.

In the preferred embodiment, spindle 60 is formed of a plastic or plastic composite material, most preferably glass-filled nylon. It has been found important during manufacture of spindle 60 that the corners 100 at the radially outer end of recess 68 (see FIG. 7) be kept as sharp as possible, so as to insure firm retention of the large-gap retainer 82 on the spindle body, successfully withstanding the stored energy in spring 80.

As will now be appreciated, the snubber apparatus according to principles of the present invention can be quickly and easily assembled using traditional mass production techniques. Further advantages of automated manufacture are possible since there is no housing surrounding the coil spring to complicate assembly. The snubber apparatus is provided as a capsule with the retained spring being maintained in compression during shipping and installation. Further, the spring can be released with a minimum of skill and tools necessary.

FIG. 4 is illustrated with a drive belt 95, in place of the drive chain 12. The belt 95 can be of the cog belt type, or the V-belt type, for example. As will be appreciated by those skilled in the art, the snubber apparatus according to principles of the present invention can be employed with virtually any type of flexible or rigid tension members.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Modular snubber apparatus for securing one end of a flexible drive member to a wall mounted on a trolley which is moved by the flexible drive member, the one end of the flexible drive member having a threaded shaft extending toward the wall, and the wall having an aperture for receiving the threaded shaft, said apparatus comprising:
    a double-ended spindle having an upstanding wall at a first end and an internal threaded bore for engagement with the threaded shaft extending between the first end and an opposed second end of the spindle;
    double-ended spring means carried on said spindle having a first end in contact with said spindle wall and a second free end; and
    retention means removably mounted on the second end of the spindle engaging the second end of the spring so as to retain the spring means in a compressed state on said spindle.

2. The apparatus of claim 1 wherein said spindle defines an annular recess adjacent the second end of the spindle, said spring means comprises a coil spring having an axial length longer than an axial length of said spindle when relaxed and said retention means comprises a split ring with a radially inner portion received in said coil spring to maintain the coil spring in said compressed state.

3. The apparatus of claim 1 wherein said spindle further includes nut means at the first end of the spindle for removing the spindle from the threaded shaft, the nut means having a threaded internal bore forming part of the internal threaded bore of the spindle.

4. Drive apparatus, comprising:
    a trolley having an upstanding wall defining an aperture for receiving a threaded shaft;
    a double-ended flexible drive member having a first end secured to said trolley and a second end with a threaded shaft extending through said trolley wall aperture;
    a double-ended spindle having an internal threaded bore for engagement with the threaded shaft, an upstanding wall at a first end of the spindle remote from the trolley wall and a second end adjacent the trolley wall, said spindle having an annular recess adjacent the second end of the spindle for detachably engaging a split ring;
    a double-ended spring means carried on said spindle in an energy storing state and having a first end in contact with said spindle wall and a second end in contact with said split ring, whereby upon detachment of said split ring from said spindle, the second end of the spring means moves into contact with the trolley wall.

5. The apparatus of claim 4 wherein said spring means comprises a coil spring having an axial length longer than the axial length of said spindle when relaxed and said split ring has a radially inner portion received in said annular recess and a radially outer portion engaging one end of the coil spring to maintain the coil spring in said shortened, energy storing configuration.

6. The apparatus of claim 4 wherein said spindle further includes nut means at the first end of the spindle for removing the spindle from the threaded shaft, the nut means having a threaded internal bore forming part of the internal threaded bore of the spindle.

* * * * *